United States Patent [19]

Kiefer

[11] 4,252,518
[45] Feb. 24, 1981

[54] VACUUM FORMING MACHINE

[75] Inventor: Günther Kiefer, Schwaigern, Fed. Rep. of Germany

[73] Assignee: Adolf Illig Maschinenbau GmbH & Co., Heilbronn, Fed. Rep. of Germany

[21] Appl. No.: 124,909

[22] Filed: Feb. 26, 1980

[30] Foreign Application Priority Data

Mar. 6, 1979 [DE] Fed. Rep. of Germany ... 7906115[U]

[51] Int. Cl.³ ............................................. B29C 17/03
[52] U.S. Cl. .................................. 425/388; 425/398; 425/DIG. 48
[58] Field of Search ............... 425/388, 394, 397, 398, 425/399, 400, DIG. 48

[56] References Cited

U.S. PATENT DOCUMENTS

| | | | |
|---|---|---|---|
| 1,671,577 | 5/1928 | Gluckin et al. | 425/DIG. 48 |
| 3,341,893 | 9/1967 | Edwards | 425/397 X |
| 3,461,504 | 8/1969 | Becker et al. | 425/384 |
| 3,465,071 | 9/1969 | Edwards | 425/397 X |
| 3,837,782 | 9/1974 | Meissner et al. | 425/388 X |
| 3,880,561 | 4/1975 | Terro | 425/398 X |
| 3,964,237 | 6/1976 | Johansen | 425/400 X |
| 4,008,029 | 2/1977 | Shokite | 425/398 X |
| 4,137,030 | 1/1979 | Sanson | 425/388 |

FOREIGN PATENT DOCUMENTS 7328626  11/1973  Fed. Rep. of Germany .

*Primary Examiner*—J. Howard Flint, Jr.
*Attorney, Agent, or Firm*—Spencer & Kaye

[57] ABSTRACT

A vacuum forming machine has a machine frame and a forming station which includes a tensioning device for clamping a thermoplastic sheet blank to be deformed into an article, a bridge and a positive mold carried thereby. The bridge is vertically displaceable together with the positive mold between an inoperative position in which the positive mold is spaced from a location where the blank is clamped by the tensioning device and an operative position in which the positive mold is in an operative, contacting relationship with the blank. The positive mold is vertically displaceable with respect to the bridge between the operative position and a transfer position in which the article formed on the positive mold is transferred therefrom.

4 Claims, 5 Drawing Figures

VACUUM FORMING MACHINE

BACKGROUND OF THE INVENTION

This invention relates to a vacuum forming machine adapted to be arranged upstream of a foaming apparatus. The machine includes a conveying device for advancing a length portion of a thermoplastic web of indeterminate length or a thermoplastic plate of definite dimensions to a forming station and further comprises devices for firmly clamping such blanks in the forming station, heating devices for heating the blanks and a bridge which supports a positive mold such that it is vertically displaceable with respect to the bridge.

It is known to associate a vacuum forming machine with a foaming apparatus. In the forming station of the machine the article to be manufactured is deep-drawn and is subsequently filled with foam in a foaming apparatus. A number of components for the automotive industry are manufactured in this manner.

In German Utility Model (Gebrauchsmuster) No. 7,328,626 there is disclosed a vacuum forming machine which cooperates with a foaming apparatus. The negative deep-drawing molds are arranged for orbital motion, thus during operation they swing in sequence into the forming station. Such a known vacuum forming machine has been found to be disadvantageous in that a positive deformation of the blanks is not possible. Such a machine, however, has particular advantages in the deformation of grained sheets including grained foam sheets as well as the manufacture of relatively deep (large-height) components.

It is a further disadvantage of the vacuum forming machine disclosed in German Utility Model No. 7,328,626 that a relatively large number of negative deep-drawing molds has to be circulated. It is difficult to maintain all these molds at a predetermined temperature which is required for the deformation.

It is further known to deform the sheet blanks directly by the foam pressure; that is, the sheet blank is positioned in a cold state into the foaming mold. The pressure generated during foaming causes the sheet blank to conform to the mold wall. Such a method is feasible, however, only in case of flat and simple shapes. Otherwise, in case of grained sheets, the upper surface structure is distorted excessively and the resetting stresses in relatively deep articles having abrupt configurations lead to a warping of the article.

SUMMARY OF THE INVENTION

It is an object of the invention to provide an improved vacuum forming machine with which a positive deformation of the blanks to be subsequently filled with foam can be achieved by means of a single mold which may be maintained at the desired temperature without difficulties. The invention has the further object to avoid the disadvantages of cold deformation by means of foam pressure.

These objects and others to become apparent as the specification progresses, are accomplished by the invention, according to which, briefly stated, in the forming station, above the clamping plane of the sheet blank, a positive mold is vertically displaceably supported on a bridge which itself can be displaced vertically with respect to the machine frame.

With the invention as outlined above it is feasible to move the positive mold into two positions. The positive mold is thus adapted to assume a first position in which the forming is performed and then the positive mold is displaced into a second position in which the transfer into the foaming molds is effected. The foaming molds are negative molds which are sequentially advanced into the forming station and which form part of the foaming apparatus.

DESCRIPTION OF THE PREFERRED EMBODIMENT

Figure 1:
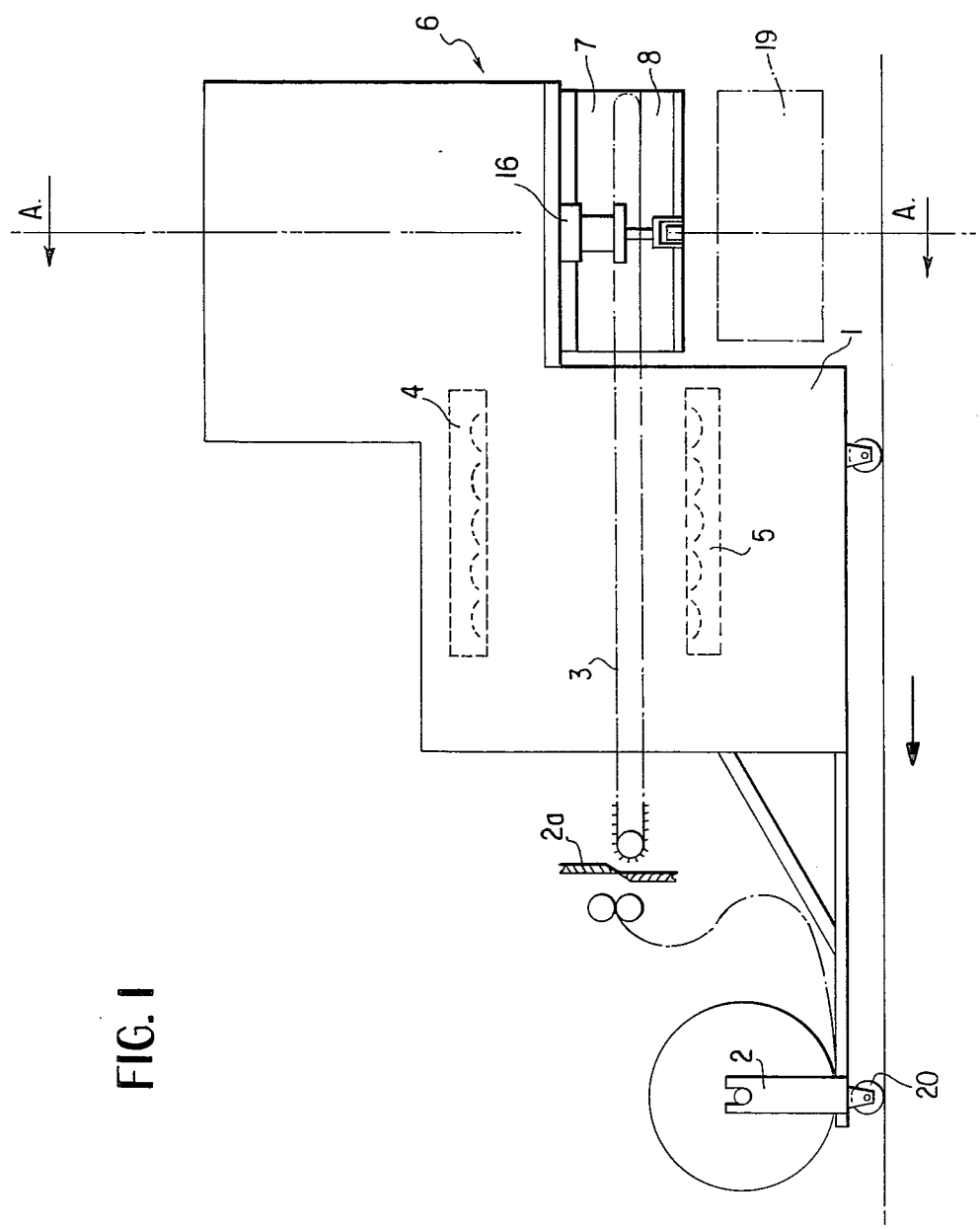
FIG. 1 is a schematic side elevational view of a vacuum forming machine according to a preferred embodiment of the invention.
Figure 2:
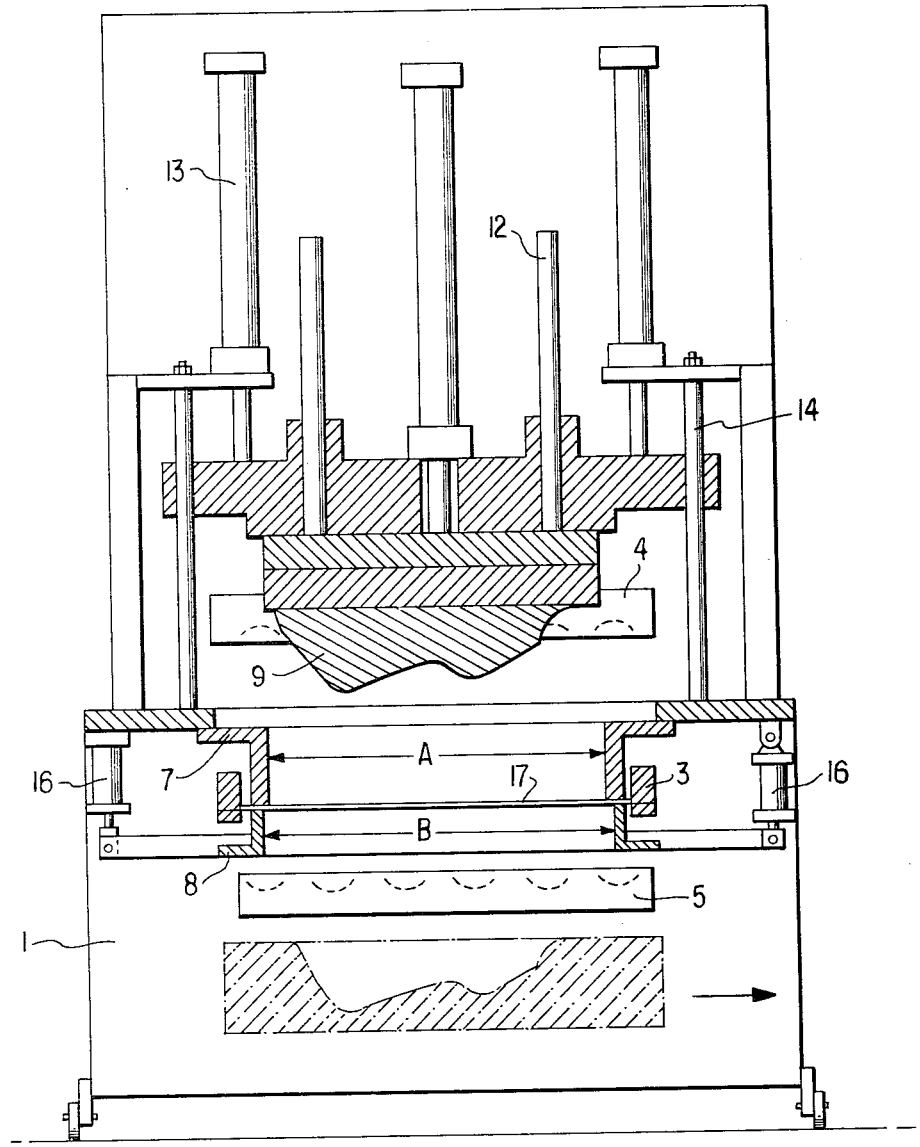
FIGS. 2, 3 and 4 are schematic sectional front elevational views taken along line A—A of FIG. 1, illustrating the preferred embodiment in different operational positions.

Turning now to the Figures, the vacuum forming machine shown therein comprises essentially a frame 1, a supply reel supporting bracket 2 for storing thermoplastic sheet material of indeterminate length, a periodically operated sheet cutter 2a and an endless conveyor 3 which advances the blank of defined dimensions to a forming station 6 as well as heaters 4 and 5 arranged on either side of the conveyor 3 for heating the blank sheet. It is to be understood that in case the blanks are thermoplastic plates of definite dimensions rather than a thermoplastic sheet stored as a roll, the storing and cutting components 2 and 2a are replaced by an appropriate plate feeding arrangement.

The forming station 6 comprises a stationary tensioning (clamping) frame 7, a movable tensioning (clamping) frame 8 and a positive mold 9. The latter is mounted on a bridge 10 and may be vertically displaced with respect thereto by means of a fluid cylinder unit 11 supported on the bridge 10. The positive mold 9 is secured to a backing plate 15, for example, by means of a screw connection. To the backing plate 15 there are affixed guide rods 12 which are slidingly received in the bridge 10, thus ensuring an accurate guidance of the positive mold 9.

According to the invention, the bridge 10 itself can be displaced vertically with respect to the machine frame 1. For this purpose there is provided a fluid cylinder drive 13 which has piston rods 13a affixed to the bridge 10. Stationary guide rods 14 mounted on the frame 1 pass through bores provided in the bridge 10 for slidably guiding the same.

Fluid cylinders 16 are provided for lifting the movable tensioning frame 8. The inner diameter B of the displaceable tensioning frame 8 is, according to a preferred embodiment of the invention, greater than the inner diameter A of the stationary tensioning frame 7 for reasons to be explained below.

In the description which follows, the operation of the above-described machine will be set forth.

Figure 3:
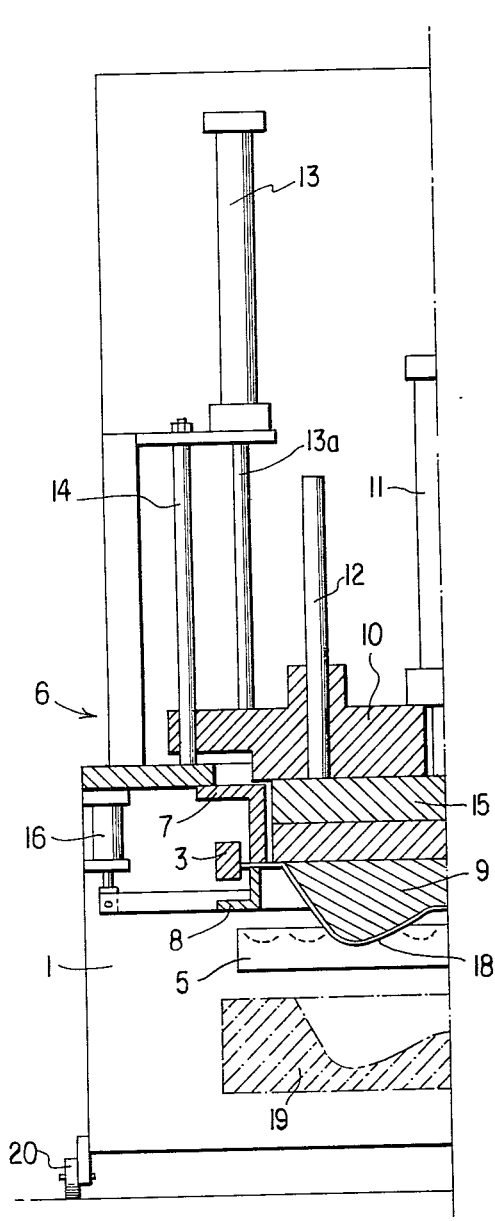

The conveyor 3 advances a blank, such as a length portion of a thermoplastic sheet or a thermoplastic plate 17 into the forming station 6 in a known manner. The blank 17 is, also conventionally, submitted to preliminary heating in the heating station comprising heaters 4 and 5. It is, however, feasible to clamp the blank 17 in a cold condition and thereafter move the heating devices 4 and 5 into the forming station 6. The blank 17 is firmly clamped about its circumference between the tensioning frames 7, 8. The positive mold 9, by displacing it downwardly together with the bridge 10, is brought into contact with the blank 17. Thereafter there occurs a positive deformation of the blank 17 by means of vacuum in a manner known by itself. The position of the positive mold 9 with respect to the frame 1 and the bridge 10 and the deformed blank (now the finished article 18) conforming to the shape of the positive mold 9 are illustrated in FIG. 3.

Figure 4:
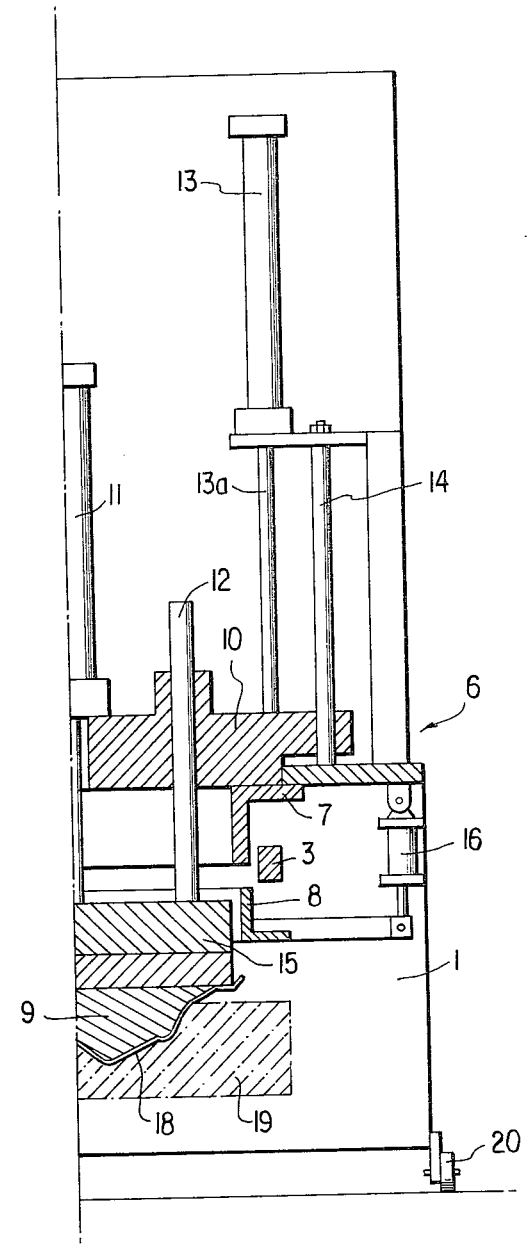

After the finished article 18 has cooled, the tensioning frame 8 is lowered by actuating the cylinders 16, whereupon the positive mold, carrying the article 18 thereon, can be moved by the cylinder 11 downwardly, relative to the bridge 10 and advanced into the foaming mold 19 as shown in FIG. 4. The article 18 is deposited into the foaming mold 19 by the positive mold 9. The foaming mold 19 is one of several such molds which travel along an endless path and which form part of a foaming apparatus.

By virtue of the feature that the inner diameter B of the movable tensioning frame 8 is greater than the inner diameter A of the stationary tensioning frame 7, the downward transfer can be performed without difficulty, because the edge zones of the article can be oriented upwardly.

As the next step, the positive mold 9 and the bridge 10 are together displaced upwardly and the conveyor 3 can now advance a new blank to the forming station 6. During the subsequent thermoforming process, a new foaming mold 19 moves into the forming station 6.

Preferably, the vacuum forming machine is displaceable; for this purpose it may be provided with casters 20 mounted on the frame 1. In this manner the machine can be displaced in the direction of the arrow towards the left as shown in FIG. 1 for facilitating a mold replacement which would otherwise be hampered by the presence of the foaming mold 19.

It will be understood that the above description of the present invention is susceptible to various modifications, changes and adaptations, and the same are intended to be comprehended within the meaning and range of equivalents of the appended claims.

What is claimed is:

1. In a vacuum forming machine including a machine frame; a forming station having tensioning means for clamping a thermoplastic sheet blank to be deformed into an article, a bridge and a positive mold carried by said bridge; the improvement comprising in combination:
    (a) first guide means for vertically displaceably supporting said bridge in said machine frame;
    (b) first drive means for vertically displacing said bridge and said positive mold as a unit between an inoperative position in which said positive mold is spaced from a location where the blank is clamped by said tensioning means and an operative position in which said positive mold is in an operative, contacting relationship with the blank clamped by said tensioning means;
    (c) second guide means for vertically displaceably supporting said positive mold on and relative to said bridge; and
    (d) second drive means for vertically displacing said positive mold with respect to said bridge between said operative position and a transfer position in which the article formed on said positive mold is transferred therefrom.

2. A vacuum forming machine as defined in claim 1, wherein said operative position is at a lower level than said inoperative position and said transfer position is at a lower level than said operative position.

3. A vacuum forming machine as defined in claim 1, wherein said tensioning means comprises a stationary clamping frame and a movable clamping frame being in substantial alignment and cooperating with said stationary clamping frame; each clamping frame having an inner diameter; the inner diameter of said movable clamping frame being greater than the inner diameter of said stationary clamping frame.

4. A vacuum forming machine as defined in claim 1, further comprising rolling elements carried by said machine frame and supporting the machine on the ground, whereby said machine is displaceable.

* * * * *